(12) United States Patent
An et al.

(10) Patent No.: US 12,099,884 B2
(45) Date of Patent: Sep. 24, 2024

(54) SCHEDULING METHOD FOR SELECTING OPTIMAL CLUSTER WITHIN CLUSTER OF DISTRIBUTED COLLABORATION TYPE

(71) Applicant: Korea Electronics Technology Institute, Seongnam-si (KR)

(72) Inventors: Jae Hoon An, Incheon (KR); Young Hwan Kim, Yongin-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 483 days.

(21) Appl. No.: 17/467,963

(22) Filed: Sep. 7, 2021

(65) Prior Publication Data
US 2022/0075665 A1 Mar. 10, 2022

(30) Foreign Application Priority Data
Sep. 10, 2020 (KR) .................. 10-2020-0116092

(51) Int. Cl.
*G06F 9/50* (2006.01)
*G06F 9/38* (2018.01)

(52) U.S. Cl.
CPC .......... *G06F 9/5077* (2013.01); *G06F 9/3891* (2013.01); *G06F 9/5005* (2013.01)

(58) Field of Classification Search
CPC .... G06F 9/5077; G06F 9/3891; G06F 9/5005; G06F 2209/503; G06F 9/505
See application file for complete search history.

(56) References Cited

U.S. PATENT DOCUMENTS 10,827,020 B1 * 11/2020 Cao .................. H04L 67/561
2012/0110651 A1 * 5/2012 Van Biljon .......... H04L 63/101
709/201

(Continued)

FOREIGN PATENT DOCUMENTS

KR 10-2154446 B1 9/2020

OTHER PUBLICATIONS

Korean Office Action issued on Mar. 3, 2021, in counterpart Korean Patent Application No. 10-2020-0116092 (3 pages in English and 5 pages in Korean).

*Primary Examiner* — Dong U Kim
(74) *Attorney, Agent, or Firm* — NSIP Law

(57) ABSTRACT

There are provided a cloud management method and a cloud management apparatus for rapidly scheduling arrangements of service resources by considering equal distribution of resources in a large-scale container environment of a distributed collaboration type. The cloud management method according to an embodiment includes: receiving, by a cloud management apparatus, a resource allocation request for a specific service; monitoring, by the cloud management apparatus, available resource current statuses of a plurality of clusters, and selecting a cluster that is able to be allocated a requested resource; calculating, by the cloud management apparatus, a suitable score with respect to each of the selected clusters; and selecting, by the cloud management apparatus, a cluster that is most suitable to the requested resource for executing a requested service from among the selected clusters, based on the respective suitable scores. Accordingly, for the method for determining equal resource arrangements between associative clusters according to characteristics of a required resource, a model for selecting a candidate group and finally selecting a cluster that is suitable to a required resource can be supported.

17 Claims, 9 Drawing Sheets

(56) References Cited

U.S. PATENT DOCUMENTS

| | | | |
|---|---|---|---|
| 2013/0111468 A1* | 5/2013 | Davis | G06F 9/5077 |
| | | | 718/1 |
| 2016/0323377 A1* | 11/2016 | Einkauf | G06F 9/5077 |
| 2018/0060894 A1* | 3/2018 | Beveridge | G06Q 30/08 |
| 2019/0294617 A1* | 9/2019 | Florissi | G06F 16/27 |
| 2019/0319844 A1* | 10/2019 | Ding | H04L 41/50 |
| 2019/0332369 A1* | 10/2019 | Gupta | G06F 8/60 |
| 2020/0042364 A1* | 2/2020 | Kumar Shimoga Manjunatha | |
| | | | H04L 41/0893 |
| 2020/0192692 A1* | 6/2020 | Ghag | H04L 43/065 |
| 2020/0267057 A1* | 8/2020 | Garvey | H04L 41/0816 |
| 2020/0301801 A1* | 9/2020 | Hegde | G06F 11/302 |
| 2021/0026707 A1* | 1/2021 | Rosenberg | G06F 9/45558 |
| 2021/0405902 A1* | 12/2021 | Sangle | G06F 3/067 |

* cited by examiner

Schedule Resource Analysis

(1) Extracting a current value from collected container network data (RX, TX)

| time | containerName | rx | tx |
|---|---|---|---|
| 1 | container1 | 100 | 100 |
| 1 | container2 | 150 | 150 |
| 1 | container3 | 100 | 100 |
| 2 | container1 | 200 | 200 |
| 2 | container2 | 250 | 250 |
| 2 | container3 | 150 | 150 | sub ⟶

| time | containerName | rx | tx |
|---|---|---|---|
| 3 | container1 | 100 | 100 |
| 3 | container2 | 100 | 100 |
| 3 | container3 | 50 | 50 |

(2) Analysis of a reason for reduction of a CPU use rate of a pod

Reduction of the CPU use rate of the pod caused by reduction of a load of the pod
- Condition 1: Amount of available resources of the CPU of the node → O
- Condition 2: Simultaneous reduction of the CPU use rate of all pods distributed in the node X Reduction of the CPU use rate of the pod caused by overload of the pod
- Condition 1: Amount of available resources of the CPU of the node → O
- Condition 2: Simultaneous reduction of the CPU use rate of all pods distributed in the node O

SCHEDULING METHOD FOR SELECTING OPTIMAL CLUSTER WITHIN CLUSTER OF DISTRIBUTED COLLABORATION TYPE

CROSS-REFERENCE TO RELATED APPLICATION(S) AND CLAIM OF PRIORITY

This application is based on and claims priority under 35 U.S.C. § 119 to Korean Patent Application No. 10-2020-0116092, filed on Sep. 10, 2020, in the Korean Intellectual Property Office, the disclosure of which is herein incorporated by reference in its entirety.

BACKGROUND

Field

The present disclosure relates generally to a cloud management method and apparatus, and more particularly, to a cloud management method and apparatus for rapidly scheduling arrangements of service resources by considering equal distribution of resources in a large-scale container environment of a distributed collaboration type.

Description of Related Art

Recently, in developing applications and making services, using a cloud environment rather than establishing an on-premise server environment is a growing trend. However, when various applications are executed in the cloud environment, there is no change in restrictions on an operating system and a platform, and existing problems of a slow development process and an inflexible application development and distribution method still remain.

In addition, a container-based micro service which efficiently uses internal resources and can distribute and manage applications rapidly on the basis of a few seconds has appeared, but the container-based micro service has a limit to expanding resources in response to increasing user traffic.

Such a micro service does not support service migration between container platforms, and requires collaboration between container platforms, which elastically provide extension and availability of the service and are regionally distributed. Therefore, the micro service has problems that it is difficult to flexibly expand resources and to maximize service migration.

To solve these problems, distributed/collaboration type container platform technology has appeared, but sequential distribution of Round Robbin scheduling rather than scheduling for equal distribution between resources is processed, and thus the problems still exist.

Accordingly, there is a demand for a method for equally distributing resources in a large-scale container environment of a distributed collaboration type of a cloud.

SUMMARY

To address the above-discussed deficiencies of the prior art, it is a primary object of the present disclosure to provide a cloud management method and a cloud management apparatus, which can proceed with high-speed scheduling to select an optimal cluster, by performing first-stage filtering to select a list of clusters (resources) close to a requested resource, and performing second-stage scoring based on the first-stage filtering.

According to an embodiment to achieve the above-described object, a cloud management method includes: receiving, by a cloud management apparatus, a resource allocation request for a specific service: monitoring, by the cloud management apparatus, available resource current statuses of a plurality of clusters, and selecting a cluster that is able to be allocated a requested resource: calculating, by the cloud management apparatus, a suitable score with respect to each of the selected clusters; and selecting, by the cloud management apparatus, a cluster that is most suitable to the requested resource for executing a requested service from among the selected clusters, based on the respective suitable scores.

In this case, selecting the cluster may include selecting a cluster to which a node having a label matching a node selector of a pod belongs.

In addition, selecting the cluster may include selecting a cluster that is able to be allocated a requested hardware resource reflecting information on whether an SSD or a GPU is owned, and a requested resource reflecting main specifications of a CPU or a memory.

In addition, selecting the cluster may include selecting a cluster that satisfies a predetermined regional condition regarding a region and a zone, and is able to allocate resources to a requested port included in the resource allocation request.

In addition, selecting the cluster may include selecting a cluster that is able to allocate resources to a requested volume included in the resource allocation request.

In addition, calculating the suitable score may include calculating a suitable score with respect to each of the selected clusters, by considering an idle resource including an idle CPU resource, an idle memory resource, an idle repository resource, and an idle network resource.

In addition, calculating the suitable score may include giving a higher suitable score to each of the selected clusters as a ratio of an amount of currently used resources to a total amount of resources is lower.

In addition, calculating the suitable score may include giving a higher suitable score to each of the selected clusters as a ratio of a sum of an amount of currently requested resources and an amount of currently used resources to a total amount of resources is lower.

In addition, calculating the suitable score may include giving a higher suitable score to each of the selected clusters as a network use rate is lower, and giving a high suitable score in order of "Best-Effort<Burstable<Guaranteed" based on QoS provided.

According to another embodiment of the present disclosure, a computer-readable recording medium has a computer program recorded thereon to perform a cloud management method, including: receiving a resource allocation request for a specific service: monitoring available resource current statuses of a plurality of clusters, and selecting a cluster that is able to be allocated a requested resource: calculating a suitable score with respect to each of the selected clusters; and selecting a cluster that is most suitable to the requested resource for executing a requested service from among the selected clusters, based on the respective suitable scores.

According to another embodiment of the present disclosure, a cloud management apparatus includes: a communication unit configured to receive a resource allocation request for a specific service; and a processor configured to monitor available resource current statuses of a plurality of clusters, and to select a cluster that is able to be allocated a requested resource, to calculate a suitable score with respect to each of the selected clusters, and to select a cluster that is most suitable to the requested resource for executing a requested service from among the selected clusters, based on the respective suitable scores.

According to another embodiment of the present disclosure, a cloud management system includes a cloud platform including a plurality of clusters, and a cloud arrangement apparatus which receives a resource allocation request for a specific service, monitors available resource current statuses of a plurality of clusters and selects a cluster that is able to be allocated a requested resource, calculates a suitable score with respect to each of the selected clusters, and selects a cluster that is most suitable to the requested resource for executing a requested service from among the selected clusters, based on the respective suitable scores.

According to embodiments of the present disclosure described above, for the method for determining equal resource arrangements between associative clusters according to characteristics of a required resource, a model for selecting a candidate group and finally selecting a cluster that is suitable to a required resource can be supported.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 7 and 8 are views provided to explain a process of distributing resources between associated container platforms.

DETAILED DESCRIPTION

Hereinafter, the present disclosure will be described in detail with reference to the accompanying drawings.

Figure 1:
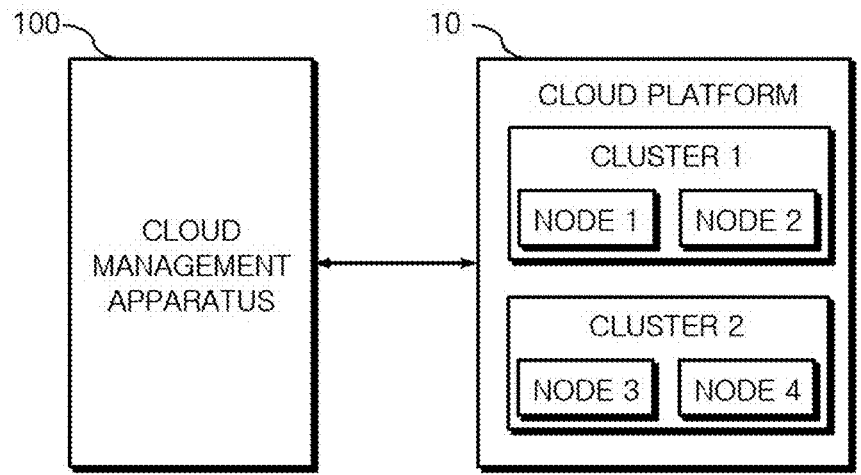
FIG. 1 is a view provided to explain a configuration of a cloud system according to an embodiment of the present disclosure.

FIG. 1 is a view provided to explain a configuration of a cloud system according to an embodiment of the present disclosure.

The cloud system according to the present embodiment can proceed with high-speed scheduling to select an optimal cluster, by performing first-stage filtering to select a list of clusters (resources) close to a required resource, and performing second-stage scoring based on the first-stage filtering.

To achieve this, a cloud platform 10 in the cloud system is managed by a cloud management apparatus 100 as shown in FIG. 1.

Specifically, the cloud management apparatus 100 monitors available resource current statuses of a plurality of clusters and selects a cluster that can be allocated a requested resource, and calculates a suitable score regarding each of the selected clusters and selects a cluster that is most suitable for the requested resource for executing a requested service from among the selected clusters.

Herein, the cloud management apparatus 100 may be implemented not only by a physically independent apparatus, but also by being included as a part of a certain device or system or a cloud. In addition, the cloud management apparatus 100 may be implemented in the form of software like a program, a platform, a framework, or application installed in a smartphone, a computer, a server, or a cloud. In addition, respective components of the cloud management apparatus 100 may be implemented by physical components or may be implemented by elements in the form of functions of software.

The cloud platform 10 may be a platform that includes a plurality of servers and provides a cloud service through virtualization, and may be implemented by Docker or Kubernetes, and may be established as a distributed, collaboration type platform environment.

As shown in FIG. 1, the cloud platform 10 may include a plurality of clusters and one cluster may include a plurality of nodes. In addition, at least one pod is included in the node.

Herein, the cluster is a set of a plurality of servers that is virtualized to appear as one server, and may be positioned by region. Specifically, the cloud platform 10 of FIG. 1 may include cluster 1 and cluster 2, and cluster 1 and cluster 2 may be positioned in different regions and zones.

Herein, the region may refer to a continent and the zone may refer to a country.

In addition, the plurality of nodes may be included in one cluster. The node indicates a server unit on the basis of which a real service (or container) is executed.

The node performs roles of generating a service and managing a service state, and includes the plurality of pods.

The cloud platform 10 structured as described above performs a function of allocating resources for executing a specific service to a node that is determined by the cloud management apparatus 100.

In addition, the cloud management apparatus 100 may perform a function of managing all clusters as a master. All commands invoke an API server of the cloud management apparatus 100, which is the master, and a node performs a necessary operation while communicating with the cloud management apparatus 100. When a container of a specific node is commanded or a log is inquired, the node is not directly commanded, and instead, the cloud management apparatus 100 is commanded, and accesses the node and responds with a result.

Figure 2:
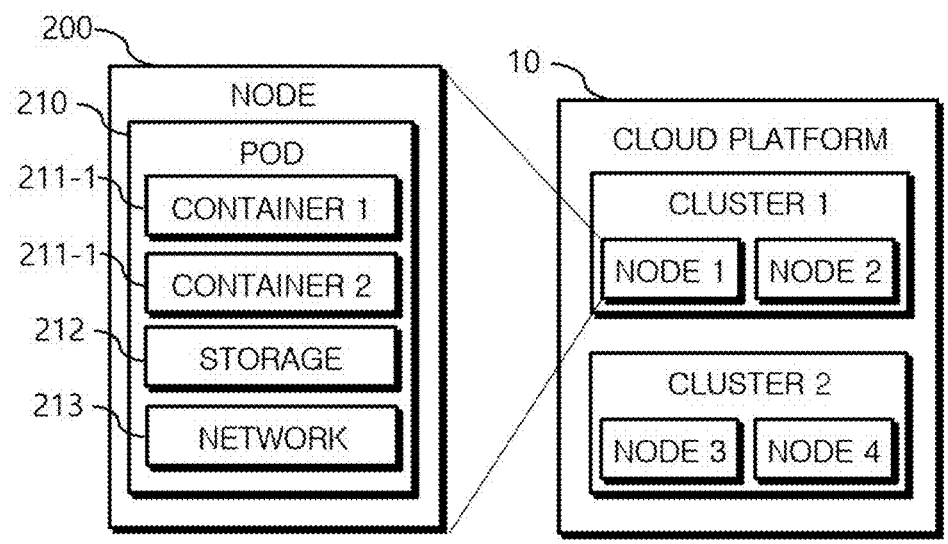
FIG. 2 is a view provided to explain a detailed configuration of a cloud platform according to an embodiment of the present disclosure.

The node includes at least one pod, and the structure of the node described above will be described in detail with reference to FIG. 2. FIG. 2 is a view illustrating a detailed configuration of the cloud platform 10 according to an embodiment of the present disclosure.

As shown in FIG. 2, the cloud platform 10 includes a plurality of nodes 200 and the node may include at least one pod 210.

The node 200 generates a necessary pod 210 while communicating with the cloud management apparatus 100, and configures a storage 212 and a network 213.

The pod 210 is a smallest distribution unit and is where real containers are generated. The pod 210 is generated and managed by a controller or a ReplicaSet, and may be expanded to hundreds of pods or thousands of pods. The pod 210 may be labeled to define its using purpose (GPU specialization, an SSD server, etc.) The pod 210 is a smallest unit that can be distributed in Kubernetes, and has attributes of one or more containers 211, the storage 213, and the network 215. The at least one container 211 included in the pod 210 may share the storage 213 and the network 215, and may access a local host.

The cloud platform 10 includes the plurality of clusters, the plurality of nodes, and the plurality of pods which are structured as described above.

Figure 3:
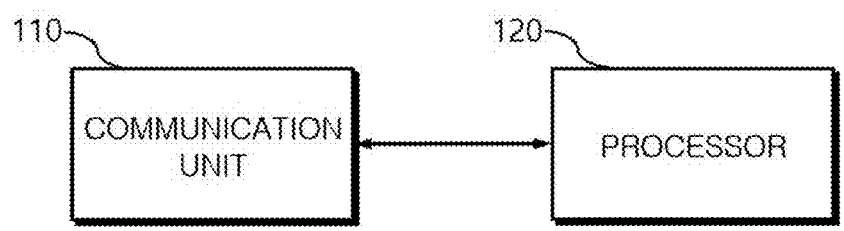
FIG. 3 is a view provided to explain a detailed configuration of a cloud management apparatus according to an embodiment of the present disclosure.

Hereinafter, a configuration of the cloud management apparatus 100 will be described in detail with reference to FIG. 3. FIG. 3 is a view illustrating the cloud management apparatus 100 according to an embodiment of the present disclosure.

As shown in FIG. 3, the cloud management apparatus 100 includes a communication unit 110 and a processor 120.

The communication unit 110 is connected with the cloud platform 10 to communicate therewith, and receive a resource allocation request for a specific service. Herein the resource allocation request for the specific service may include information regarding resources necessary for the corresponding service, and specifically, the resource allocation request for the specific service may include at least one of API version information, type information, label information, CPU requirement, memory requirement, storage requirement, policy information, restriction on the number of disorders, and regional information. In addition, the resource allocation request for the specific service may further include information regarding a weighting of each resource type.

The communication unit 110 is a communication means for transmitting and receiving data necessary for operations of the processor, and may perform communication in various wireless communication methods such as Bluetooth, WiFi, near field communication (NFC), cellular, long-term evolution (LTE), or the like, and may also perform communication through wired communication like a wired local area network (LAN).

For example, the communication unit 110 may receive a resource allocation request for a specific service.

The processor 120 controls overall operations of the cloud management apparatus 100.

Specifically, the processor 120 may perform the role of a master cluster (OpenMCP cluster), and may monitor available resource current statuses of a plurality of clusters, may select a cluster that can be allocated a requested resource, may calculate a suitable score regarding each of the selected clusters, and may select a cluster that is most suitable for the requested resource for executing a requested service from among the selected clusters, based on the suitable score.

Figure 4:
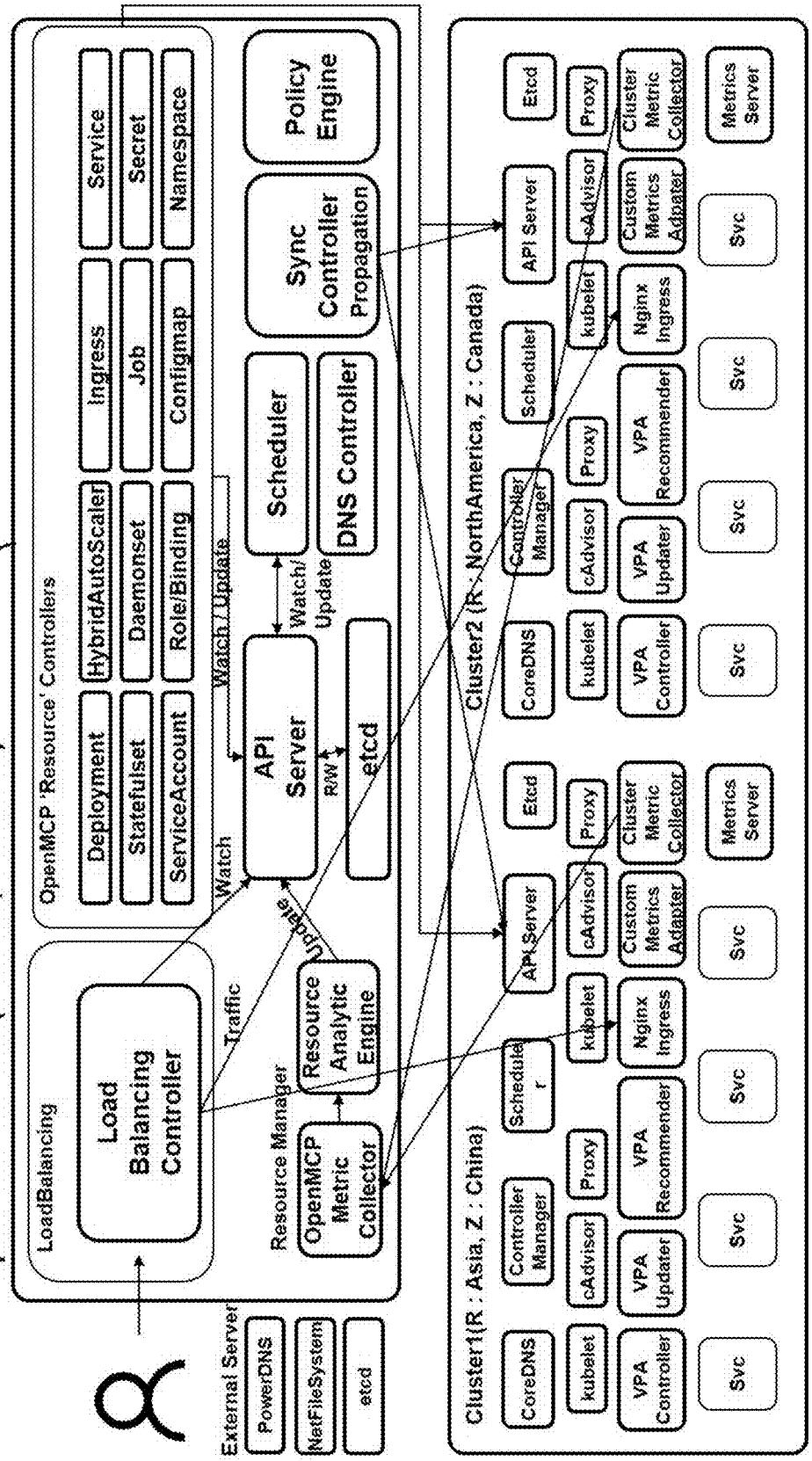
FIG. 4 is a view provided to explain a process of determining equal arrangements according to an available resource current status between associative clusters in a container environment of a distributed collaboration type according to an embodiment of the present disclosure.
Figure 5:
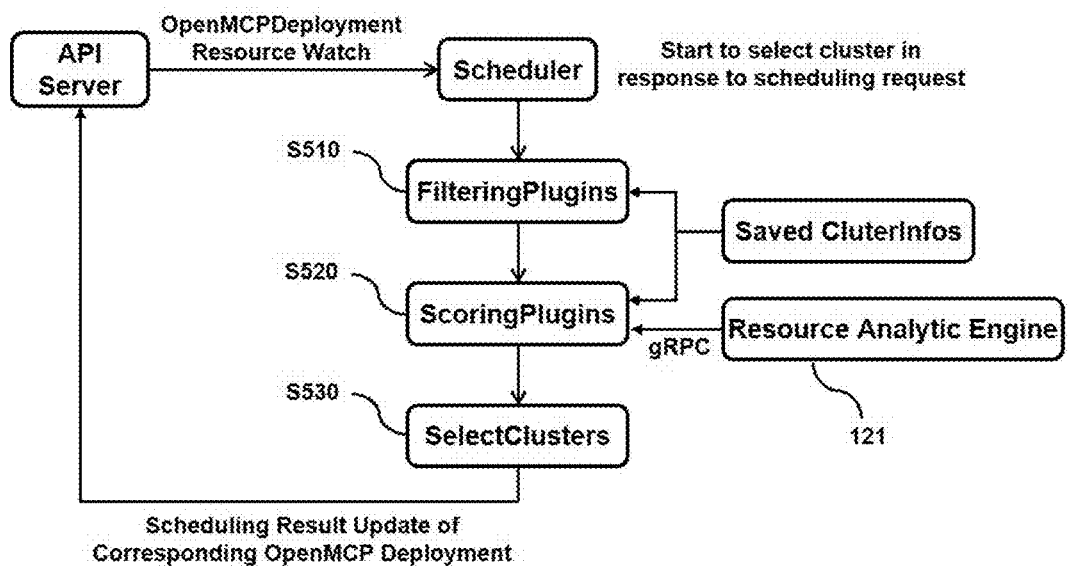
FIG. 5 is a view provided to explain a cloud management method for scheduling arrangements rapidly according to an embodiment of the present disclosure.

FIG. 4 is a view provided to explain a process of determining equal arrangements according to an available resource current status between associative clusters in a container environment of a distributed collaboration type according to an embodiment of the present disclosure, and FIG. 5 is a view provided to explain a cloud management method for rapidly scheduling arrangements according to an embodiment of the present disclosure.

Referring to FIGS. 4 to 5, the cloud system according to the present embodiment proceeds with scoring for two-step scheduling (arrangement cluster selection) with respect to each resource of an associative cluster, based on monitoring of large scale resources, in order to show a method for determining equal arrangements according to an available resource current status between associative clusters in a container environment of a distributed collaboration type. Through this, the present cloud system can determine high-speed resource arrangement that is most suitable according to characteristics of a requested resource.

Specifically, the cloud management method using the cloud management apparatus 100 performs a master cluster function of managing all clusters, and, when a resource allocation request for a specific service is received from a client, the method may proceed with high-speed scheduling by monitoring available resource current statuses of a plurality of clusters and selecting a cluster that can be allocated a requested resource (S510), calculating a suitable score regarding each of the selected clusters (S520), and selecting a cluster that is most suitable for the requested resource for executing a requested service from among the selected clusters, based on the suitable score (S530).

For example, the cloud management apparatus 100 scores through one or more first-stage filtering six-steps and one or more second-stage scoring steps in order to select a cluster that is suitable for the required resource, and can reduce an analysis time required to select through pre-monitoring.

To achieve this, the processor 120 of the cloud management apparatus may include a resource analytic engine 121 to calculate a suitable score for each of the selected clusters.

Figure 6:
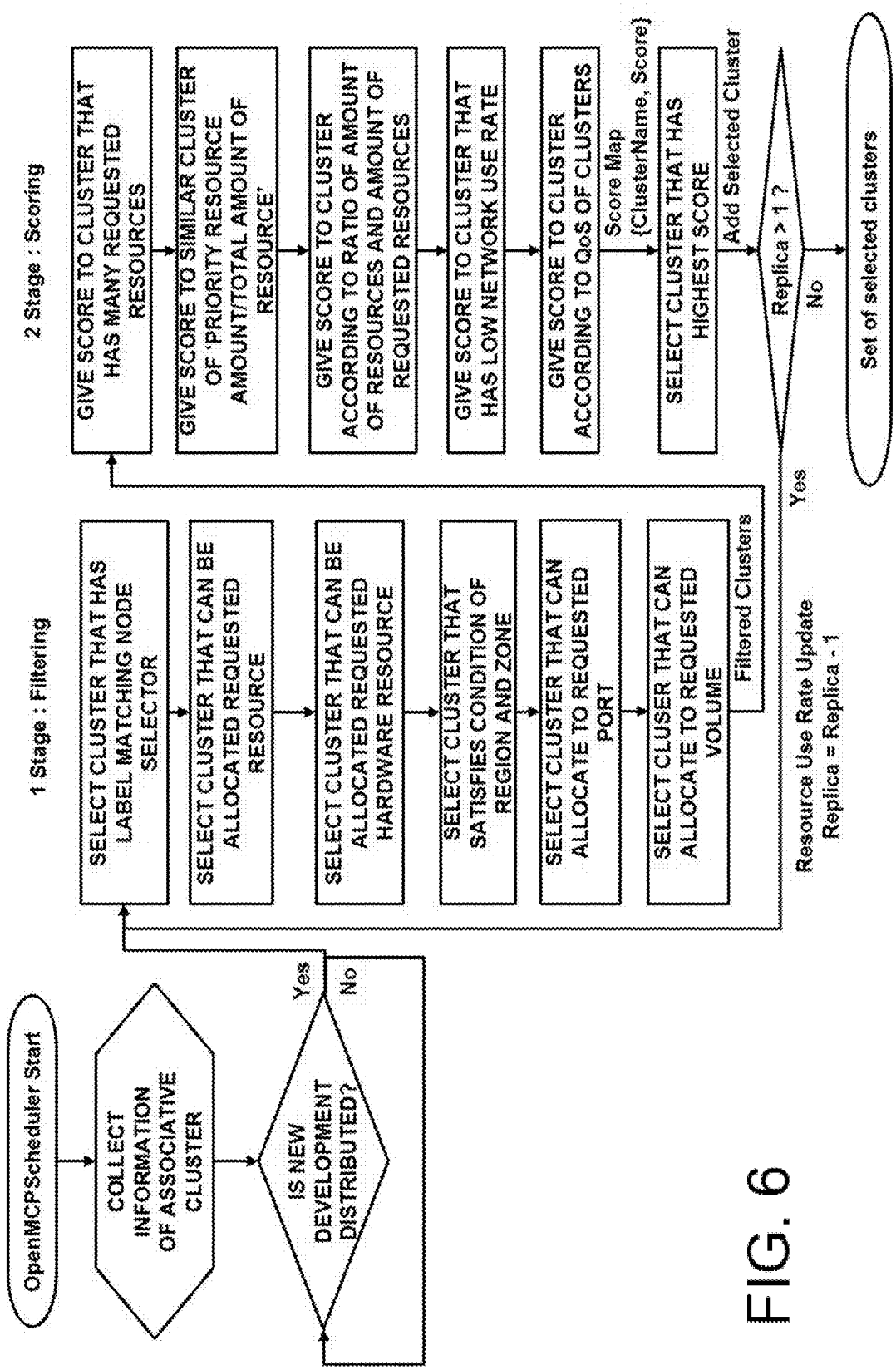
FIG. 6 is a view provided to explain the cloud management method of FIG. 5 in more detail.
Figure 7:
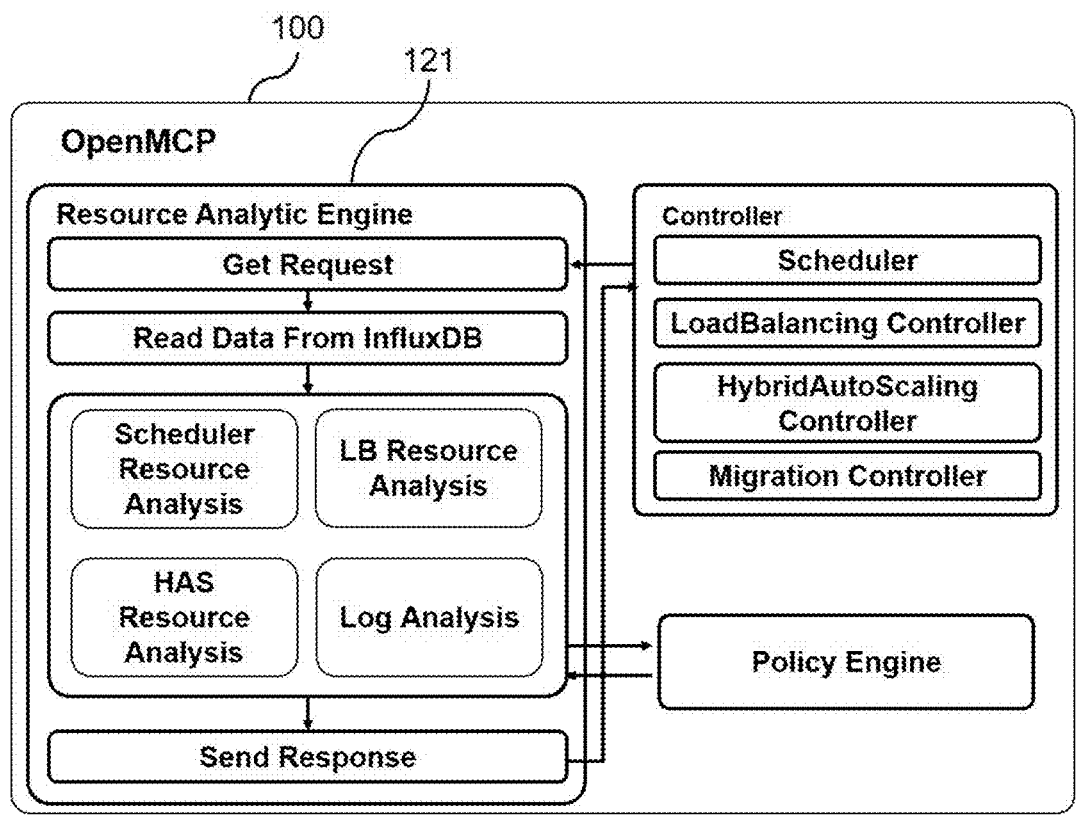

FIG. 6 is a view provided to explain the cloud management method of FIG. 5 in more detail, and FIGS. 7 and 8 are views provided to explain a process of distributing resources between associated container platforms.

Referring to FIGS. 6, 7, and 8, the present cloud management method may give a score through one or more filtering steps and one or more scoring steps in order to select a cluster that is suitable for a required resource.

Specifically, the first-stage filtering steps may include one or more steps of: a step (S610) of selecting a cluster to which a node having a label matching a node selector of a pod belongs: steps (S615, S620) of selecting a cluster that can be allocated a requested (required) hardware resource reflecting information on whether a solid state drive (SSD) or a graphics processing unit (GPU) is owned, and a requested (required) resource reflecting main specifications of a central processing unit (CPU) or a memory; a step (S625) of selecting a cluster that satisfies a pre-set regional condition regarding a region and a zone: a step (S630) of selecting a cluster that can allocate resources to a requested port included in the resource allocation request; and a step (S635) of selecting a cluster that can allocate resource to a requested volume included in the resource allocation request.

For example, as shown in FIG. 6, the first-stage filtering steps may select a cluster to which a node having a label matching a node selector of a pod belongs, may select a cluster that can be allocated a requested (required) hardware resource reflecting information on whether an SSD or a GPU is owned, and a requested (required) resource reflecting main specifications of a CPU or a memory, may select a cluster that satisfies a pre-set regional condition regarding a region and a zone, may select a cluster that can be allocated a requested port included in the resource allocation request, and may select a cluster that can allocate resources to a requested volume included in the resource allocation request, by applying the above-mentioned filtering steps in sequence.

Herein, the step of selecting the cluster that can allocate resources to the requested volume included in the resource allocation request may be extending a node level NoDiskConflict of the existing Kubernetes to a cluster level, and may be selecting a cluster that can allocate resources to the requested volume.

The cloud management method may calculate a suitable score by going through one or more scoring steps with respect to each of the clusters selected through the first-stage filtering steps.

Specifically, the second-stage scoring step for calculating the suitable score may include one or more steps of: a step of calculating a suitable score regarding each of the selected clusters by considering an idle resource including an idle CPU resource, an idle memory resource, an idle repository resource and an idle network resource: a step of giving a higher suitable score to each of the selected clusters as a ratio of an amount of currently used resources to a total amount of resources is lower; a step of giving a higher suitable score to each of the selected clusters as a ratio of a sum of an amount of currently requested resource and an amount of currently used resources to the total amount of resources is lower: a step of giving a higher suitable score to each of the selected clusters as a network use rate is lower; and a step of giving a high suitable score in order of "Best-Effort<Burstable<Guaranteed", based on quality of service (QOS) provided.

For example, as shown in FIG. 6, the second-stage scoring step may calculate a suitable score regarding each of the selected clusters by considering an idle resource including an idle CPU resource, an idle memory resource, an idle repository resource and an idle network resource, may give a higher suitable score to each of the selected clusters as a ratio of an amount of currently used resources to a total amount of resources is lower, may give a higher suitable score to each of the selected clusters as a ratio of a sum of an amount of currently requested resource and an amount of currently used resources to the total amount of resources is lower, may give a higher suitable score to each of the selected clusters as a network use rate is lower, and may give a high suitable score in order of "Best-Effort<Burstable<Guaranteed", based on quality of service (QOS) provided, by applying the above-mentioned scoring steps in sequence.

In this case, since reduction in the CPU use rate of a pod caused by overload appears only in Best-Effort, the cloud management apparatus 100 may prohibit distribution of the Best-Effort pod (=a pod in which a resource request and a limit value are not set).

At the step of giving the higher suitable score to each of the selected clusters as the ratio of the amount of currently used resources (used) to the total amount of resources (available) is lower, the suitable score may be calculated through Equation 1 presented below. In this case, a priority resource amount refers to an amount of currently used resources.

$$\text{resourceScoringFunction}((used),available) = (100 - ((available-(used))100/available)) \quad \text{Equation 1}$$

In addition, at the step of giving the higher suitable score to each of the selected clusters as the ratio of the sum of the amount of currently requested resources (request) and the amount of currently used resources (used) to the total amount of resources (available) is lower, the suitable score may be calculated through Equation 2 presented below:

$$\text{resourceScoringFunction}((reqeust+used),available) = (100 - ((available-(request+used))*100/available)) \quad \text{Equation 2}$$

In addition, at the step of giving the higher suitable score to each of the selected clusters as the network use rate (network transmission amount+network reception amount) is lower, the suitable score may be calculated through Equation 3 presented below:

$$\text{score} = \sum_{pod0}^{podM} \sum_{container0}^{containerN} \frac{1}{\text{container\_network\_receive\_bytes\_current} + \text{container\_network\_transmit\_bytes\_current}} \quad \text{Equation 3}$$

In addition, when a certain kind of available resource is weighted from among the plurality of available resources, the cloud management apparatus 100 may give a relatively high score to a cluster that has higher availability of the weighted available resource than the other clusters.

For example, the cloud management apparatus 100 may give a weighting score to an available resource of a CPU or a memory or may give different weighting scores to the CPU and the memory, respectively, according to an available resource weighting score included in policy information.

The cloud management apparatus 100 aggregates the scores calculated (given) respectively, and selects a cluster that is most suitable to the requested resource for executing the requested service from among the selected clusters (S670).

For example, the cloud management apparatus 100 may aggregate the scores calculated (given) respectively, and may select two or more nodes included in the cluster that is most suitable to the requested resource and may allocate resources for executing the requested service.

Through this, a model for selecting the cluster that is most suitable to the requested resource may be supported finally.

Meanwhile, the cloud management apparatus 100 may reduce analysis time required to select the cluster through pre-monitoring.

Specifically, the cloud management apparatus 100 performs the second-stage scoring process with respect to the cluster that is selected through the first-stage filtering steps. However, when the clusters owned by services are classified, the cloud management apparatus 100 may calculate a suitable score regarding an available resource current status of each cluster with respect to all clusters owning a specific service, by using the resource analytic engine 121, before the first-stage filtering steps, so as to reduce analysis time required to select the cluster.

In this case, the cloud management apparatus 100 may extract a current value of the available resource current status from collected container network data (RX, TX) by using the resource analytic engine 121 as shown in FIG. 8.

Figure 9A:
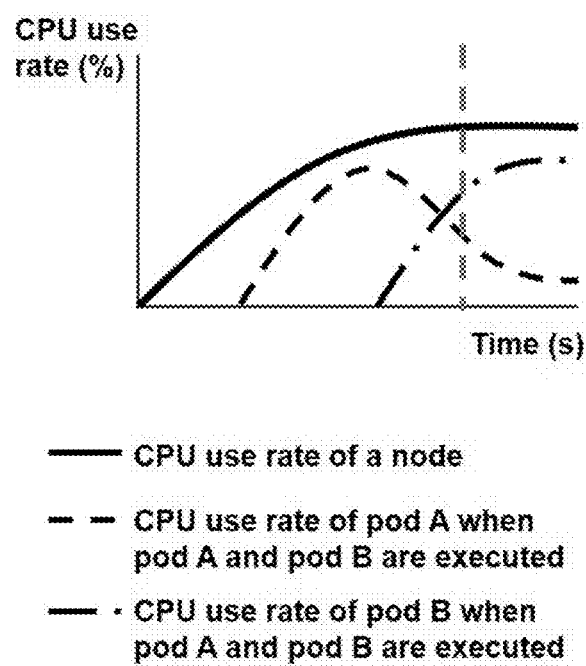
FIGS. 9A and 9B are views illustrating a case where a CPU use rate of a pod is reduced.
Figure 9B:
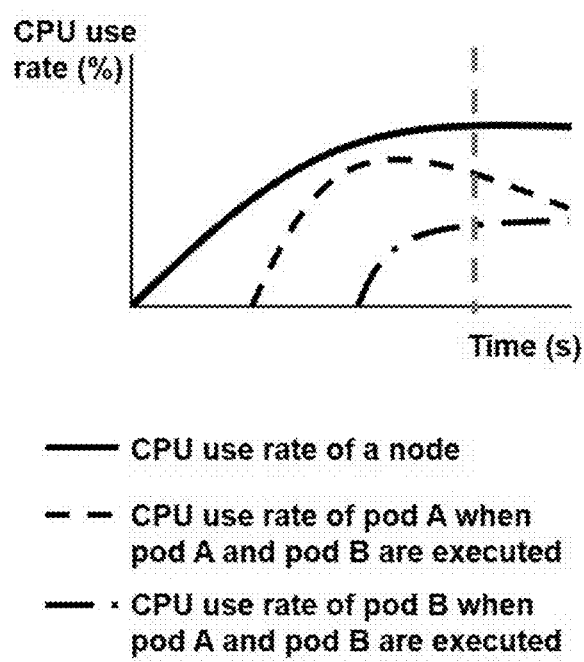

FIGS. 9A and 9B are views illustrating a case in which a CPU use rate of a pod is reduced.

The resource analytic engine 121 is provided with a scheduler resource analysis which is capable of performing pre-monitoring with respect to the clusters owned by services, and may analyze a reason for reduction of the CPU use rate of the pod which receives traffic.

For example, when the CPU use rate of the node which receives traffic is about 100%, and the CPU use rates of all pods (pod A, pod B) distributed in the node which receives traffic are not simultaneously reduced as shown in FIG. 9A, the resource analytic engine 121 may determine that the CPU use rate of the pod is reduced due to reduction in a load of the pod.

On the other hand, when the CPU use rate of the node which receives traffic is about 100% and the CPU use rates of all pods (pod A, pod B) distributed in the node which receives traffic are simultaneously reduced, the resource analytic engine 121 may determine that the CPU use rate of the pod is reduced due to overload of the pod.

When it is determined that the CPU use rate of the pod is reduced due to the overload of the pod, the cloud management apparatus 100 may exclude the corresponding pod from the scheduler and may determine equal resource arrangements between the associative clusters.

The technical concept of the present disclosure may be applied to a computer-readable recording medium which records a computer program for performing the functions of the apparatus and the method according to the present embodiments. In addition, the technical idea according to various embodiments of the present disclosure may be implemented in the form of a computer readable code recorded on the computer-readable recording medium. The computer-readable recording medium may be any data storage device that can be read by a computer and can store data. For example, the computer-readable recording medium may be a read only memory (ROM), a random access memory (RAM), a CD-ROM, a magnetic tape, a floppy disk, an optical disk, a hard disk drive, or the like. A computer readable code or program that is stored in the computer readable recording medium may be transmitted via a network connected between computers.

In addition, while preferred embodiments of the present disclosure have been illustrated and described, the present disclosure is not limited to the above-described specific embodiments. Various changes can be made by a person skilled in the art without departing from the scope of the present disclosure claimed in claims, and also, changed embodiments should not be understood as being separate from the technical idea or prospect of the present disclosure.

What is claimed is:

1. A cloud management method comprising:
receiving, by a cloud management apparatus, a request of allocating resources requested for a requested service;
monitoring, by the cloud management apparatus, current statuses of available resources included in a plurality of clusters, and determining clusters that are able to be allocated the requested resources;
calculating, by the cloud management apparatus, a suitable score with respect to each of the determined clusters, including determining a ratio of a sum of an amount of currently requested resources and an amount of currently used resources to a total amount of resources, and assigning a higher suitable score to each of the determined clusters as the ratio is lower; and
selecting, by the cloud management apparatus, a cluster that is most suitable to the requested resources for executing the requested service from among the selected determined clusters, based on the respective suitable scores.

2. The method of claim 1, wherein the selecting the cluster comprises selecting a cluster to which a node, having a label matching a node selector of a pod, belongs.

3. The method of claim 1, wherein the selecting the cluster comprises selecting a cluster that is able to be allocated a requested hardware resource including a solid state drive (SSD) or a graphics processing unit (GPU), and a requested resource including a central processing unit (CPU) or a memory.

4. The method of claim 1, wherein the selecting the cluster comprises selecting a cluster that satisfies a predetermined regional condition regarding a region and a zone, and is able to allocate resources to a requested port included in the request.

5. The method of claim 1, wherein the selecting the cluster comprises selecting a cluster that is able to allocate resources to a requested volume included in the request.

6. The method of claim 1, wherein the calculating the suitable score comprises calculating the suitable score with respect to each of the determined clusters, by considering an idle resource comprising an idle CPU resource, an idle memory resource, an idle repository resource, and an idle network resource.

7. The method of claim 6, wherein the calculating the suitable score comprises giving another higher suitable score to each of the determined clusters as a ratio of the amount of currently used resources to the total amount of resources is lower.

8. The method of claim 6, wherein the calculating the suitable score comprises giving another higher suitable score to each of the determined clusters as a network use rate is lower, and
giving a score in order of Quality of Service (QOS) provided.

9. A non-transitory computer-readable recording medium having a computer program recorded and storing instructions thereon that, when executed by one or more processors, configure the one or more processors to perform a cloud management method, comprising:
receiving a request of allocating resources requested for a requested service;
monitoring current statuses of available resources included in a plurality of clusters, and determining clusters that are able to be allocated the requested resources;
calculating a suitable score with respect to each of the determined clusters, including determining a ratio of a sum of an amount of currently requested resources and an amount of currently used resources to a total amount of resources, and assigning a higher suitable score to each of the determined clusters as the ratio is lower; and
selecting a cluster that is most suitable to the requested resource for executing the requested service from among the determined clusters, based on the respective suitable scores.

10. A cloud management apparatus comprising:
- a communication processor configured to receive a request of allocating resources requested for a requested service; and
- a processor configured to monitor current statuses of available resources included in a plurality of clusters, and to determine clusters that are able to be allocated the requested resources, to calculate a suitable score with respect to each of the determined clusters, and to select a cluster that is most suitable to the requested resources for executing the requested service from among the determined clusters, based on the respective suitable scores,
- wherein, for the calculating the suitable score, the processor is configured to determine a ratio of a sum of an amount of currently requested resources and an amount of currently used resources to a total amount of resources, and assign a higher suitable score to each of the determined clusters as the ratio is lower.

11. The apparatus of claim 10, wherein, for the selecting the cluster, the processor is configured to select a cluster to which a node, having a label matching a node selector of a pod, belongs.

12. The apparatus of claim 10, wherein, for the selecting the cluster, the processor is configured to select a cluster that is able to be allocated a requested hardware resource including a solid state drive (SSD) or a graphics processing unit (GPU), and a requested resource including a central processing unit (CPU) or a memory.

13. The apparatus of claim 10, wherein, for the selecting the cluster, the processor is configured to select a cluster that satisfies a predetermined regional condition regarding a region and a zone, and is able to allocate resources to a requested port included in the request.

14. The apparatus of claim 10, wherein, for the selecting the cluster, the processor is configured to select a cluster that is able to allocate resources to a requested volume included in the request.

15. The apparatus of claim 10, wherein, for the calculating the suitable score, the processor is configured to calculate the suitable score with respect to each of the determined clusters, by considering an idle resource comprising an idle CPU resource, an idle memory resource, an idle repository resource, and an idle network resource.

16. The apparatus of claim 15, wherein, for the calculating the suitable score, the processor is configured to assign another higher suitable score to each of the determined clusters as a ratio of the amount of currently used resources to the total amount of resources is lower.

17. The apparatus of claim 15, wherein, for the calculating the suitable score, the processor is configured to assign another higher suitable score to each of the determined clusters as a network use rate is lower, and
- assign a score in order of Quality of Service (QOS) provided.

* * * * *